United States Patent [19]

Junck

[11] 4,435,643
[45] Mar. 6, 1984

[54] GAMMANETRIC THICKNESS MEASURING APPARATUS

[75] Inventor: Guy Junck, Esch, Luxembourg

[73] Assignee: Arbed S. A., Luxembourg, Luxembourg

[21] Appl. No.: 341,231

[22] Filed: Jan. 21, 1982

[30] Foreign Application Priority Data

Jan. 23, 1981 [LU] Luxembourg .................. 83083

[51] Int. Cl.$^3$ ............................................ G01M 23/00
[52] U.S. Cl. .................................................. 250/358.1
[58] Field of Search ............... 250/358.1, 359.1, 360.1, 250/496.1, 497.1; 378/203

[56] References Cited

U.S. PATENT DOCUMENTS

| | | | |
|---|---|---|---|
| 2,772,361 | 11/1956 | Hiestand | 250/497.1 |
| 3,808,437 | 4/1974 | Miyagawa et al. | 378/54 |
| 4,370,555 | 1/1983 | Brethon et al. | 378/120 |

Primary Examiner—Alfred E. Smith
Assistant Examiner—C. Hannaher
Attorney, Agent, or Firm—Karl F. Ross

[57] ABSTRACT

An apparatus for the nondestructive determination of the thickness of an article, e.g. a rolled steel product such as a beam, comprises a plurality of radiation sources mounted in a sectoral body rotatable about an axis such that the center of gravity of the body is offset from this axis. The body is received within a massive shielding structure so that it can be swung into a trough-like recess formed in the latter when not in use and can be swung out of this recess to bring the respective radiation sources into registry with a window formed in a cover overlying the trough-shaped body and defining a space which is filled with a cooling and absorbing fluid. The device is provided between conveyor rollers of a rolling mill line.

6 Claims, 2 Drawing Figures

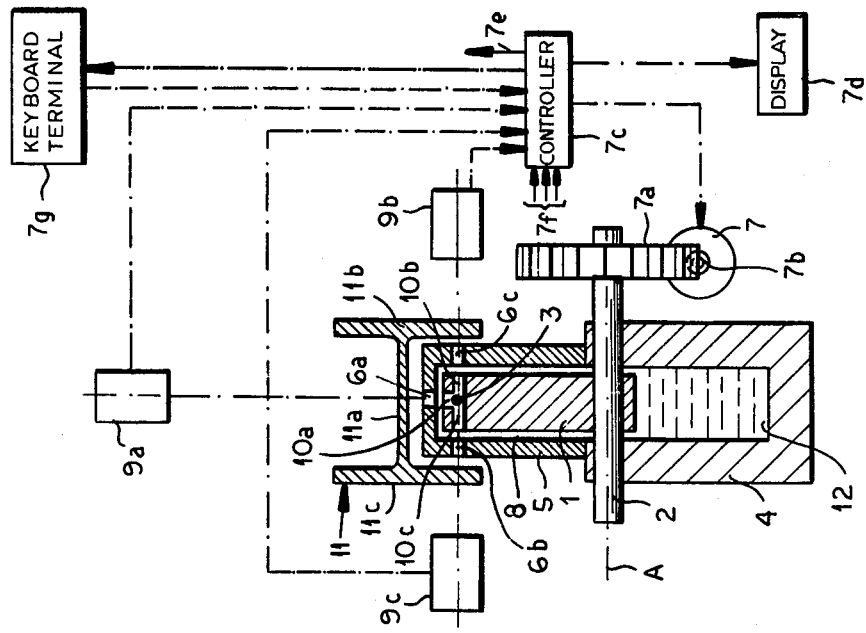
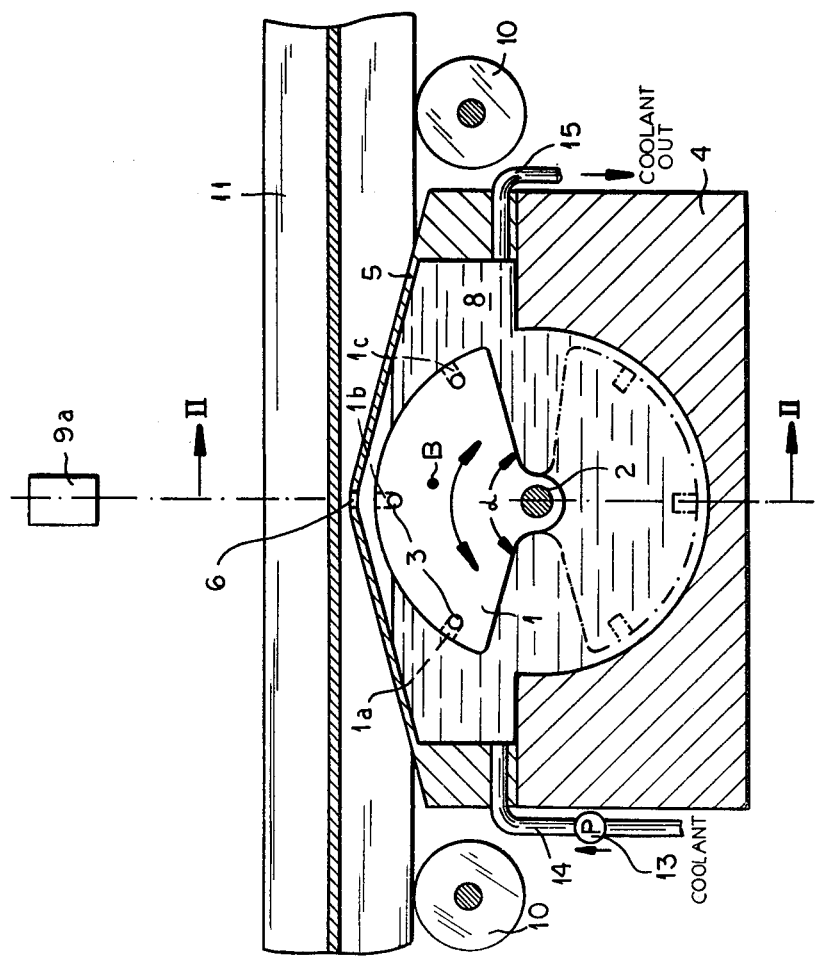

GAMMANETRIC THICKNESS MEASURING APPARATUS

CROSS REFERENCE TO RELATED APPLICATION

This application is related to the commonly assigned copending application Ser. No. 337,419 filed Jan. 6, 1982.

FIELD OF THE INVENTION

My present invention relates to an apparatus for the nondestructive testing of articles, especially rolling-mill products such as I-beams, H-beams and other rolled structural shapes, and more specifically, for the measurement of thickness of portions of such rolled shapes, e.g. the thickness of a web or flange thereof. The invention, more particularly, relates to a gammametric thickness measuring device, i.e. a device using a radiation source rich in gamma rays, for thickness measurement.

BACKGROUND OF THE INVENTION

For many articles, especially metal objects such as rolling-mill products, namely, structural shapes having webs and flanges, it is frequently necessary to determine the thickness of portions of the article, e.g. the web or flange, during the manufacturing process. When the manufacturing process involves the use of a rolling-mill line comprising a plurality of rolling stands interconnected by a conveyor, e.g. a roller conveyor, along which the article is displaced, the measuring device can be provided along this line for the nondestructive measurement of the thickness of a selected portion of the article utilizing, for example, a radiation source. While the present invention is concerned primarily with thickness measurement, it has general application to nondestructive testing utilizing radiation sources of the type described.

In gammametric measurements of the aforedescribed type, the radiation source may be rich in gamma emissions and, in general, a plurality of such sources is required, the sources being calibrated so that each has a respective gamma energy.

Gammametric apparatus of the aforedescribed type may be utilized to control the rolling process or to ascertain the corresponding dimension of the product, or even to determine whether the product corresponds to an appropriate standard.

While efforts have been made to use gammametric measurements for this purpose heretofore, they have been less than successful because of the dangers inherent in the use of gamma-ray sources.

OBJECTS OF THE INVENTION

It is, therefore, the principal object of the present invention to provide a gammametric measurement apparatus for the aforedescribed purposes which is capable of fulfilling the analytical and nondestructive testing or measurement requirements of industry, free from all risk to the safety of the operator.

Another object of this invention is to provide a nondestructive measuring apparatus, which can be disposed along a rolling-mill line safely and economically and which enables the use of a plurality of radioactive sources with different emission energies or powers.

Still another object of this invention is to provide an apparatus of the type described which, even in the event of a power failure, will automatically revert to an inoperative mode in which there is little, if any, emission to the environment.

SUMMARY OF THE INVENTION

These objects and others which will become apparent hereinafter are obtained, in accordance with this invention, in an apparatus which comprises a block of radiation-absorption material formed along its periphery with respective cavities receiving radiation sources of different power and rotatable about an axis, e.g. by a servomotor actuated from a remote source. This body is eccentric with respect to its axis, i.e. has a center of gravity which is offset therefrom.

The body is rotatable relative to a housing which can be a thick-walled block of radiation absorbing material formed with a trough into which the body carrying the radioactive sources can be swing in an inoperative position. The body is provided with a cover, which can also be composed of radiation absorbing material and which overlies the mouth or open side of the trough and extends over the body and is provided with at least one window with which the radiation sources can be selectively aligned for gammametric measurement. The radiation-passing window can also be provided in line with a radiation detector across the path of the article whose thickness is to be measured so that the spacing between the detector and the window is sufficient to enable at least a wall of the article to be passed therebetween.

Consequently, the block carrying the radiation sources is adapted to be swung into the trough or recess in an inoperative position in which the housing body shields the radiation sources and prevents escape of radiation. In this case, the radiation sources lie along the bottom of the trough and additional shielding is provided by the balance of the block above these sources or between these sources and the mouth of the trough.

The servomotor can swing the block out of the trough into its operative position in which the radiation sources are selectively juxtaposed with the windows. Because of the eccentric location of the center of gravity of the block, in the event of failure of the servomotor or the power supply to the system, the block will swing automatically into its inoperative position.

Thus, even in the event of a power failure, operator failure or like disturbance, safety is ensured.

According to a feature of the invention, the block has the configuration of a sector of a disk extending over an arc length of less than 180° and the radiation forces are disposed in cavities formed at the periphery of this sector. The radiation sources may be disposed in cavities having passages turned toward the respective radiation detectors, e.g. radially or axially, and the thickness of the block may be such that it can fit, together with the aforementioned cover, between flanges of an I-beam or like structural shape so that thickness measurements can be effected not only of the web but of these flanges as well.

The apparatus can be disposed between two conveyor rollers of the roller conveyor between mill stands or elsewhere along the rolling mill line.

According to another feature of the invention, the cover defines with the housing body and the swingable block, a compartment which is supplied with a radiation-absorbing and cooling liquid.

It has been found to be advantageous, moreover, to make the trough of circular arc-segmental shape, conforming to the configuration of the block, whereby the wall of the trough closely surrounds the block when the latter is swung into its inoperative position.

The radiation-absorbing material which can be used for the present invention can be lead and the cooling liquid can be water or a liquid with an enhanced radiation-absorbing effect, e.g. water containing deuterium oxide.

BRIEF DESCRIPTION OF THE DRAWING

The above and other objects, features and advantages of the present invention will become more readily apparent from the following description, reference being made to the accompanying drawing in which:

FIG. 1 is a longitudinal section through an apparatus of the present invention disposed between conveyor rollers of a rolling-mill line for measurement of the thickness of the web and flanges of an I-beam; and FIG. 2 is a section taken along the line II—II of FIG. 1.

SPECIFIC DESCRIPTION

The apparatus of the present invention comprises a block 1 which, as seen in projection on a plane perpendicular to its axis A has the configuration of a sector of a circle whose arc length is less than 180°, i.e. is defined between flanks including an angle $\alpha$ of less than 180°, mounted on a shaft 2 rotatable about the axis A, the block 1 having a significant thickness as shown in FIG. 2 and a center of gravity B which is offset from the axis A.

Thus, when the block 1 is not held in its operative position shown in solid lines in FIG. 1, it automatically falls into its inoperative position in dot-dash lines in this figure.

Along the periphery of the block 1, there are provided three radiation sources 3, i.e. gamma-ray sources of different energies or powers, each source 3 being disposed in a respective cavity 1a, 1b or 1c so that these sources may in turn be positioned for gammametric measurements in the manner to be described.

Each of the cavities 1a, 1b and 1c comprises a radial passage 10a and a pair of axial passages 10b and 10c.

This configuration is desirable to enable simultaneous thickness measurements of the web 11a and the flanges 11b, 11c of an I-beam 11 displaced along a roller conveyor between rollers 10 of which the device is disposed, the roller conveyor forming part of a rolling-mill line.

The axis A and the shaft 2 are disposed below the upper edge of a housing body 4 on which the shaft is journaled. The housing body 4, also composed of radiation-absorbing material like the block 1, is provided with a semicircular trough 12 open upwardly and into which the block 1 can be swung.

A protective cover or cap 5, also composed of radiation-absorbing material, is mounted upon the body 4 over the mouth of the trough 12 and reaches over the block 1 when the latter is swung into its operative position as shown in solid lines in FIG. 1.

The cover 5 is formed with windows 6a, 6b, 6c which can be aligned with the passages of each radiation source, selectively, and in line with radiation detectors 9a, 9b and 9c spaced from these windows to enable the webs and flanges of the I-beam to be interposed between the cover 5 and the detectors.

The detectors can be connected to conventional circuitry to display the thickness of the I-beam portions traversed by the gamma rays from the radiation source as is conventional in the gammametric art.

A servomotor 7 connected, for example, by a worm 7b and a worm wheel 7a, drives the shaft 2 and is operated from a remote location to selectively position the gamma ray sources in juxtaposition with the windows 6a–6c, the transmission 7a, 7b and the servo motor being designed so that, upon deenergization of the servo motor, the body 1 can fall freely into its inoperative position.

A compartment 8 is defined by the cover 5 and the body 4 and contains a radiation-absorbing and coolant liquid which can be circulated through the compartment by a pump 13 via lines 14 and 15. When the windows 6a–6c are closed by membranes permeable to gamma radiation, the entire compartment 8 can be filled with the liquid. When the windows 6a–6c are merely openings, the liquid is circulated at a rate such that the upper level of the liquid in the compartment lies below the lowermost window.

The control circuit 7c for the servo motor 7 may receive inputs from the detectors 9a–9c and can control the motor 7 in response to a predetermined program, generating a thickness display at 7d. A controller of this type can be readily operated utilizing a microprocessor and conventional microprocessor programming.

The measurement results can include thicknesses, heights, widths, cross-sectional area and symmetry as well as the degree of uniformity as the beam passes over the apparatus. A direct control of the rolling-mill line from the microprocessor controller 7a is also possible.

It has been found to be advantageous, moreover, to program the controller 7a to provide a display of the weight per unit length of the product and an output which can signal the operator that the product deviates from a standard. Additional inputs to the controller, when the latter has an output 7e controlling the mill, have been represented at 7f and can include rate of rolling, temperature of the product and length of the product.

Naturally, these signals may be provided with conventional signal-shaping circuitry before being delivered to the controller 7a which can also receive an input from and have an output to a keyboard or other terminal monitored by the operator. The total weight of the product can also be transmitted to the operator along with the other indicia mentioned who may introduce signals for controlling the rolling operation. Such a terminal is represented at 7g (see the commonly assigned copending application Ser. No. 337,419 filed Jan. 6, 1982 in this regard).

I claim:

1. An apparatus for the gammametric measurement of an article, comprising:
   a block rotatable about an axis and having a center of gravity offset therefrom while being provided along its periphery with a plurality of spaced apart radiation sources;
   a radiation-absorbing body formed with a trough adapted to receive said block;
   means connected to said block for swinging same from an inoperative position wherein said radiation sources are disposed within said trough into an operative position wherein said radiation sources are disposed at a location remote from the bottom of said trough;
   a cover mounted on said body and enclosing said block in the operative position thereof, said cover having at least one window alignable with said radiation sources selectively; and a radiation detector spaced from said cover and aligned with said window for detecting radiation traversing said window and passing through an article disposed between said cover and said detector.

2. The apparatus defined in claim 1 wherein said article is a rolled structural shape composed of metal and displaced along a roller conveyor, said apparatus being positioned between two rollers of said conveyor.

3. The apparatus defined in claim 1 wherein said block has, in projection on a plane perpendicular to said axis, the configuration of a circle sector of an arc length less than 180°, the axis of said block corresponding to the center of said circle.

4. The apparatus defined in claim 1 wherein said block is provided with a shaft rotatable about said axis and journaled on said body, said axis being disposed below the upper edges of said body and said cover lying on said upper edges of said body.

5. The apparatus defined in claim 1 wherein said cover defines with said body a chamber, further comprising means for circulating a cooling and radiation-absorbing fluid through said chamber.

6. The apparatus defined in claim 1, claim 2, claim 3, claim 4 or claim 5 wherein said article is an I-beam and said cover is adapted to fit between flanges of said I-beam in juxtaposition with a web thereof, said cover being formed with a radial orifice turned toward said web and lateral orifices turned toward said flanges and in alignment with respective radiation detectors, and trough having a circular sectoral configuration and said radiation sources being disposed in cavities along the periphery of said block having passages extending radially and laterally for alignment with said windows.

* * * * *